United States Patent
Lee et al.

(10) Patent No.: US 8,255,584 B2
(45) Date of Patent: Aug. 28, 2012

(54) SYSTEMS AND METHODS FOR MANAGING I/O THROUGHPUT FOR LARGE SCALE COMPUTING SYSTEMS

(75) Inventors: Donald G. Lee, Eagan, MN (US); John L. Bauer, Hanska, MN (US)

(73) Assignee: I/O Doctors LLC, Eagan, MN (US)

( * ) Notice: Subject to any disclaimer, the term of this patent is extended or adjusted under 35 U.S.C. 154(b) by 0 days.

(21) Appl. No.: 13/036,159

(22) Filed: Feb. 28, 2011

(65) Prior Publication Data

US 2011/0219149 A1  Sep. 8, 2011

Related U.S. Application Data

(60) Provisional application No. 61/310,040, filed on Mar. 3, 2010.

(51) Int. Cl.
*G06F 3/00* (2006.01)
*G06F 15/16* (2006.01)

(52) U.S. Cl. .......................... 710/15; 709/203

(58) Field of Classification Search ................ 710/15; 709/203

See application file for complete search history.

(56) References Cited

U.S. PATENT DOCUMENTS

| | | | |
|---|---|---|---|
| 2010/0138479 A1* | 6/2010 | Zhu | 709/203 |
| 2010/0146207 A1* | 6/2010 | Kakui et al. | 711/114 |
| 2010/0312967 A1* | 12/2010 | Kasai et al. | 711/129 |

* cited by examiner

*Primary Examiner* — Hyun Nam

(74) *Attorney, Agent, or Firm* — Fogg & Powers LLC

(57) ABSTRACT

System and methods for managing I/O throughput for large scale computing systems are provided. In one embodiment, an operating system for a computer system having a processor, a memory and at least one data storage device is provided. The operating system comprises: an operating system kernel; at least one filesystem controlling access to the at least one data storage device; and a toolkit module installed within the operating system kernel. The toolkit module monitors input/output (I/O) calls communicated via a datapath between at least one software application being executed on the processor and the filesystem. The toolkit module inserts one or more tools into the datapath, the one or more tools each executing a predefined function based on observation of a first set of the I/O calls being communicated in the datapath.

18 Claims, 8 Drawing Sheets

SYSTEMS AND METHODS FOR MANAGING I/O THROUGHPUT FOR LARGE SCALE COMPUTING SYSTEMS

CROSS-REFERENCE TO RELATED CASES

This application claims the benefit of U.S. Provisional Application No. 61/310,040 filed on Mar. 3, 2010, which is incorporated herein by reference in its entirety.

BACKGROUND

Computer systems rely on the ability to access data. Certain data is stored within the computer itself in memory. Other data is stored externally on one or more disk storage systems. The computer's processor will access input data, perform a set of calculations, and provide output data. Because the computer typically cannot hold all the data it needs in its internal memory to complete the set of calculations, it creates temporary "scratch" data that is written to disk and recalled by the processor when it is again needed to complete another calculation. Large quantities of data may be swapped between the internal memory and the disk storage system multiple times, depending on the complexity of the calculations being performed. For complex calculations involving large input and output data sets, a tremendous amount of scratch data can be generated.

Disk storage systems such as a Redundant Array of Independent Disks ("RAID") exemplify a data transfer optimization technique with advantages and disadvantages. RAID utilizes a technology that gangs multiple disk drives together, creating a "fat" data pipe that provides multiple channels for access to the ganged drives simultaneously (that is, in parallel). The drives are all working together so that if you have 10 drives ganged together, you can realize 10 times the bandwidth for accessing data (as compared to a single drive). RAID thus provides a large bandwidth data pipe which allows large volumes of data to be quickly transferred. One problem with RAID systems is that because multiple disk drives are being used for every transfer, relatively small chunks of data require more disk activity. Thus access times can be longer than with a single disk drive. For example, to update a single item of data that is smaller in size than the bandwidth of the minimum block size accessed by the 10-wide RAID system, the computer would need to read in the entire block across all 10 drives, update the single item of data, and then write the entire block back out to all 10 drives. RAID is a good technique for transferring large amounts of contiguous data but if an application requests many small, non-sequential updates to its files, the RAID system will actually result in slower input/output (I/O) access than if a single disk were used. RAID, therefore illustrates an I/O performance optimization that is either helpful or harmful, depending on what type of I/O is to be done.

Moving data between the computer's memory and the disk storage system is the work of the computers file system, which is an integral part of the computer's operating system kernel. File systems use technologies that will cache data and generate metadata associated with data files stored on disk storage systems. Such metadata for a file includes information about a file such as file creation time/date, file modification time/date, last access date/time, user permissions, file ownership, etc. Some systems are sensitive to lost data and need the file system to work even when component failures occur. Such systems will typically update a file's metadata every time an application accesses that file. For example, the file system would instruct the disk storage to update a file and its metadata, and wait for a confirmation of completion before proceeding with its next task. In contrast, some systems value speed and will allow the file system to keep meta data in memory and write metadata updates back out to the disk storage using "lazy" update methods. For example, for a big file on a UNIX system utilizing a 10-wide RAID, every time an application writes to a file, the file system is supposed to update the modification time for that file. The file system will read the sector containing the metadata into memory, patch in the metadata update, and write the sector back out to disk. The file system thus has two jobs associated with the file access because after it streams data to the 10-wide stripe it must then update the metadata by reading in the sector, patching the metadata, and writing it back out. While updating the metadata, all other disk access is suspended. By using lazy updates for metadata, the file system can wait and update all pending metadata for a batch of files at once (for example only save metadata on a periodic schedule).

Unfortunately for application developers, file systems available today are designed with a "one-size-fits-all" approach, and optimized for a broad range of conditions, minimizing instances of extremely poor performance, but seldom, if ever, achieving optimal performance. Further, there is a dearth of good tools for analyzing the I/O activity generated by applications, and for providing application designers with detailed information about how I/O access affects their application's performance.

For the reasons stated above and for other reasons stated below which will become apparent to those skilled in the art upon reading and understanding the specification, there is a need in the art for systems and methods for managing I/O throughput for large scale computing systems.

SUMMARY

The Embodiments of the present invention provide methods and systems for managing I/O throughput for large scale computing systems and will be understood by reading and studying the following specification.

In one embodiment, an operating system for a computer system having a processor, a memory and at least one data storage device is provided. The operating system comprises: an operating system kernel; at least one filesystem controlling access to the at least one data storage device; and a toolkit module installed within the operating system kernel. The toolkit module monitors input/output (I/O) calls communicated via a datapath between at least one software application being executed on the processor and the filesystem. The toolkit module inserts one or more tools into the datapath, the one or more tools each executing a predefined function based on observation of a first set of the I/O calls being communicated in the datapath.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide a filesystem toolkit module, referred to herein as "fsTK", that allows a user to declare files that are to be treated differently, whether for statistical analysis or for performance optimization. For example, in one embodiment, fsTK provides an application user with the ability to direct that when an application accesses a large file (called "big", for example) the computer will direct access to a storage device system and/or use a file system that optimized for large files. Similarly, when the application needs to perform a random update to a database file (called "db", for example), the computer will direct access to a storage device and/or use a file system that is optimized for smaller files. This is accomplished by the fsTK module by inserting one or more "tools" in the toolkit module into a datapath of input/output I/O call requests. This is done without the need to modify either the application code or the code of the computers underlying file systems.

Figure 1:
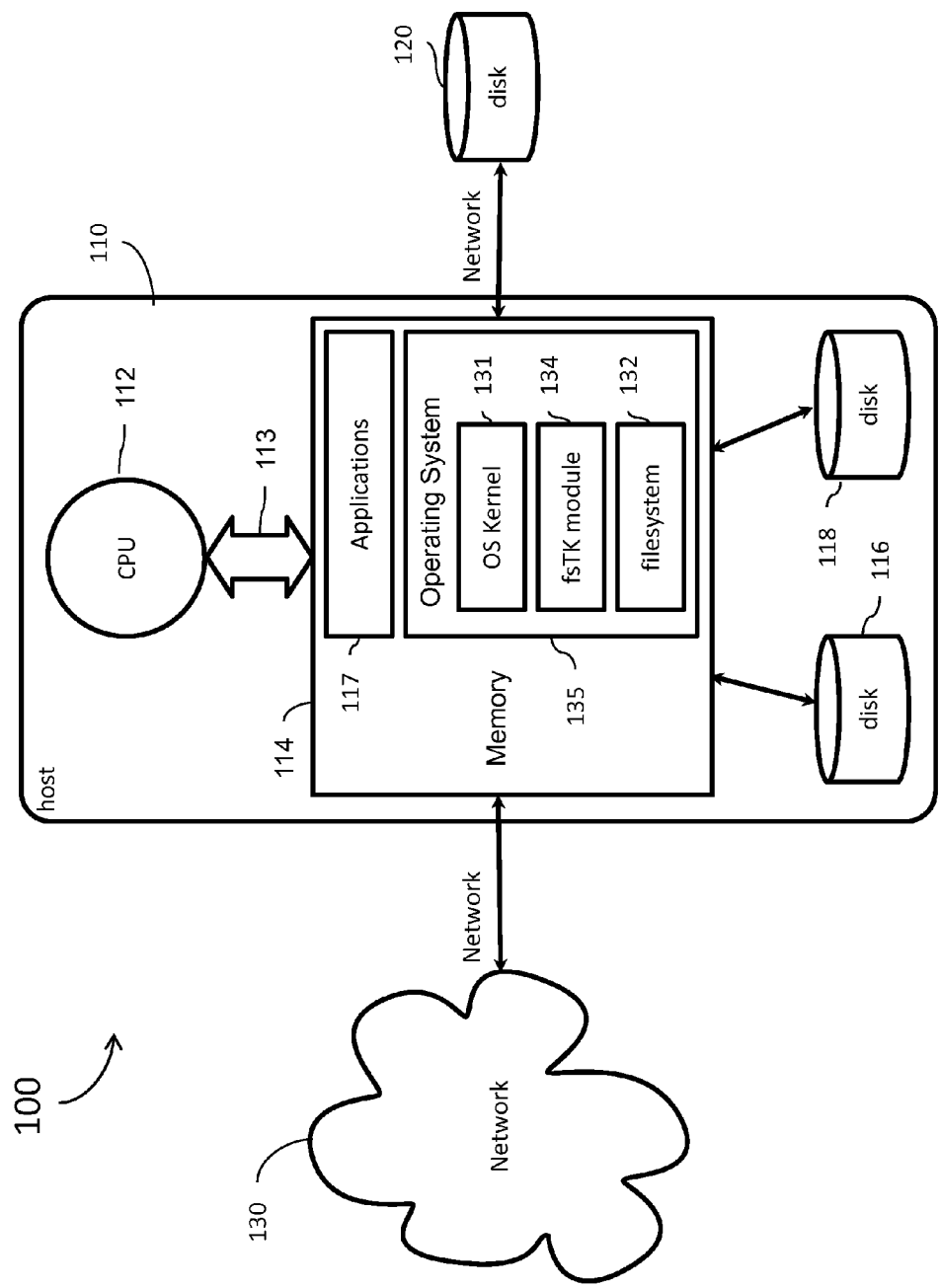
FIG. 1 is a block diagram illustrating a computer system of one embodiment of the present invention.

FIG. 1 is a diagram illustrating a computer system 100 for implementing a fsTK module 134 of one embodiment of the present invention. System 100 includes a host computer (or "Host") 110 that include a central processing unit (CPU) 112, a memory 114 and one or more data storage devices, such as 116 and 118. In one embodiment, CPU 112 is a single core processor. In other embodiments, CPU 112 includes multiple processing cores. In one embodiment, data storage devices 116 and 118 are disk storage devices. However, they are not so limited and other embodiments including implementations using other data storage technologies are contemplated. In one embodiment, host 110 accesses at least one network connected data storage device 120. In one embodiment host 110 is further linked to a network 130 that may provide input data to host 110 generated by other computers accessible through the network 130, sensors accessible through network 130, or other data sources. Moving data between memory 114 and disk storage devices 116, 118, 120 is the work of host 110's filesystem 132, which along with the operating system kernel 131 is an integral part the operating system 135. As will be discussed in greater detail below, fsTK module 134 is implemented as a module within the operating system kernel 131.

In the embodiment illustrated in FIG. 1, CPU 112 executes applications 117 (which may be large-scale applications such as those using finite element codes for automotive model geometry analysis) that perform multitudes of calculations at iterative time steps. Examples of applications 117 include, but are not limited to, NASA Structural Analysis (NAS-TRAN), ABAQUS, and other graphics processing software packages. For example, NASTRAN is a finite element analysis program originally developed for NASA in the 1960s. With NASTRAN, large sets of data are generated and need to be stored at every calculation step of the analysis. But at the same time, for each step random updates to database items are also performed. In addition, metadata associated with both the large dataset files and the smaller random access database updates must be maintained. ABAQUS provides another example of a large-scale application.

Host 110 takes input data, performs computations, and produces results. Processing of the data is performed by the CPU 112, and through very high speed operations between the computer's internal memory 114 and the CPU 112 via bus 113. Input data is gathered from a variety of sources and put onto disks 116, 118 and 120. One or more applications 117 executed by CPU 1112 provide the structure and instructions for performing an end user's core work by processing input data and transforming the input data into a useful form for the end user. That useful form may be graphical output such as figures, raw output data, code for execution by other processors, or electronic signals for controlling other physical devices such manufacturing machinery or robots, for example. Typically, the applications 117 bring the input data from disk storage 116, 118 into memory 114, perform the computation and then put some form of results back onto disk storage 116, 118. The process of computation normally includes multiple instances of moving data back and forth between disk storage 116, 118, memory 114 and the CPU 112. Intermediate results that do not fit in memory 114 are often stored temporarily on disk storage devices 116, 118. This is often called "scratch I/O" because disk storage used in this way is "scratch space" for applications. Scratch I/O is commonly used in applications 117, regardless of how much memory 114 is available, because no matter how capable the hardware, there are always needs that arise that require greater amounts of data.

Efficient computation requires data to be shuttled between memory 114 and CPU 112 at very high speed. CPU memory 114 access time is measured in nanoseconds (billionths of a second). Access times for disk storage devices 116 and 118 may be in tens or hundreds of microseconds (millionths of a second), or even milliseconds (thousandths of a second). As would be appreciated by one of ordinary skill in the art after reading this specification, a few operations that take a thousand or a million times as long as others can have a huge impact on overall performance of application execution. When CPU 112 is finished with a computation, results are moved typically to one of disk storage devices 116, 118 or 120. Often a disk storage device is a network attached disk (such as shown at 120), which can be shared with other CPUs or hosts computers accessible to host 110 via network disk 120. Although data storage devices 116, 118 and 120 are sometimes described herein as "disk storage devices", embodiments of the present invention are not limited only to storage devices having rotating magnetic disk platters. For example, storage devices 116, 118 and 120 in alternate embodiments may be implemented with solid state, optical, flash, or other data storage technologies including, but not limited to, drives using removable discs or tapes.

As would be appreciated by one of ordinary skill in the art after reading this specification, hardware for implementing computer system 110 may be accomplished via many CPU variants, differing data storage types and storage systems. Similarly, at the software level, a multitude of operating system (OS) variants and versions, file systems and versions, and runtime library variants exist for performing the many tasks that interface applications with the hardware.

As described below, one or more embodiments of fsTK module 134 provide tools for statistically analyzing the I/O generated by applications 117 so that developers and end-users can identify how routines within the applications 117 are behaving with respect to disk access requests. Further embodiments of fsTK module 134 provide a toolkit that customizes disk access behaviors, without the need to modify the code for either user applications 117 or alter the underlying filesystem 132's code.

Figure 2:
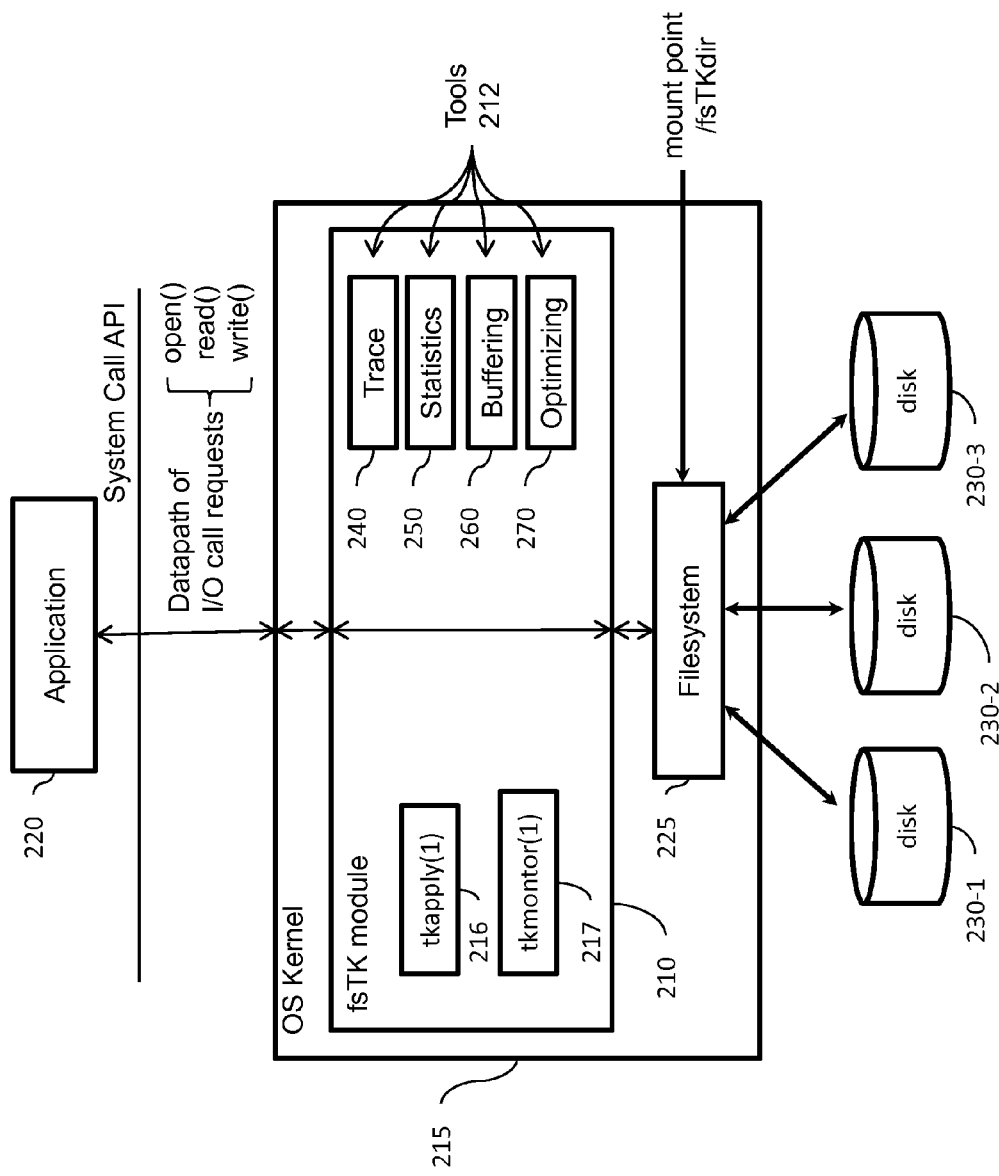
FIGS. 2-6 are block diagrams illustrating a filesystem toolkit module of one embodiment of the present invention.

FIG. 2 is a block diagram illustrating an fsTK module 210 installed within an operating system kernel 215 of one embodiment of the present invention. For at least one embodiment, the following description of fsTK module 210 applies to the operation of fsTK module 134 described above in FIG. 1. In that case, OS Kernel 215 and filesystem 225 correspond to the respective OS Kernel 131 and filesystem 132 of FIG. 1. The fsTK module 210 operates as a meta-filesystem module that is dynamically loaded into the operating system kernel 215 of host 110 and operates as a proxy between an application 220 being executed by CPU 112 and the native file system 225 that provides access to the disk storage devices 230-1 to 230-3. From the perspective of application 220, it appears as if the application is working with filesystem 225. That is, from the perspective of application 220, fsTK module 210 emulates filesystem 225.

The fsTK module 210 provides a user with one or more tools (shown generally at 212) which each perform a predefined function based on the I/O calls observed in the datapath between application 220 and filesystem 225. Module 210 further provides, as discussed in greater detail below, a support application used to declare which files used by application 220 are to be specially handled, or otherwise singled out for statistical analysis. The fsTK module 210 provides visibility into I/O operations for debugging, tracing, and statistics. Such information is invaluable for determining the I/O behavior of application 220 as it is executing. The fsTK module 210 provides control of I/O operations to transparently change nature of I/O operations as desired by the application end user. The fsTK module 210 provides precision for applying tools 212 only where directed by the application end user on a per file and per directory basis. The fsTK module 210 provides these tools 212 to the end user with complete transparency. That is, from the perspective of application 220, the application is working with filesystem 225. From the perspective of filesystem 225, it believes it is handling I/O calls directly from application 220. No code modifications to either application 220 or filesystem 225 are required to implement the features of fsTK module 210. It is compatible with all storage systems and file systems that follow platform standards.

The fsTK module 210 is implemented as a loadable kernel module, which is loaded in to the operating system kernel 215 and used to mount one or more filesystems (such as filesystem 225) that are to be controlled by fsTK module 210. As would be appreciated by one of ordinary skill in the art upon reading this specification, although FIG. 2 illustrates a kernel 215 having a single filesystem 225, in other embodiments, multiple files systems would be installed within kernel 215. In such embodiments, the fsTK module 210 functions with each of those filesystems in the same manner as described herein for filesystem 225. The fsTK module 210 comprises tools 212 built into module 210 for both monitoring and manipulating I/O between application 220 and the one or more of disk storage devices 230-1 to 230-3. The tools illustrated in FIG. 2 include tracing tool 240, statistics tool 250, buffering tool 260 and optimizing tool 270. This list of tools is not meant to be exhaustive and embodiments of the present invention may incorporate other tools.

The fsTK module 210 further implements a support application (shown as tkapply(1) at 216) that provides a user the ability to direct the behavior of the fsTK module 210, and apply different optimization tools on different user files. For example, in one embodiment, support application 216 is accessible via a terminal line command "tkapply(1)". Parameters entered with the tkapply(1) command instruct fsTK module 210 which, if any, of tools 212 to apply to I/O calls between application 220 and filesystem 225, and to which specific I/O calls the tools 212 should be applied. As would be appreciated by those of ordinary skill in the art upon reading this specification, the name tkapply(1) as a command is used herein is for example purposes only and other command names may be used. Also, the utility and function provided by the tkapply(1) command as described herein may, in other embodiments, be accomplished via an graphical user interface (GUI) application in addition to, or rather than, via a terminal line command.

More specifically, Tkapply(1) is a utility provided with fsTK module 210 that allows the user to direct certain files to be treated differently by fsTK module 210. In one embodiment, Tkapply(1) uses a file system namespace to communicate what files are to be treated specially and provides for a syntax to set defaults, and patterns of file handling to ease usage. By default, when no specific I/O behavior is requested by a user through the tkapply(1) utility, the native file handling behavior of filesystem 225 is not changed. When specific I/O behavior is requested by a user through the tkapply (1) utility, file operations are altered only for the file systems mounted by fsTK module 210, and then only for the files requested. Other file systems within kernel 215 remain unaffected. That is, for the filesystem 225 mounted by fsTK module 210, application 220 will still use, for example, standard Portable Operating System Interface for Unix (POSIX) open/read/write system calls to perform I/O. When application 220 accesses a file for which no special handling is requested, fsTK module 210 simply passes the system calls through to filesystem 225. When the user uses the tkapply(1) utility to request special handling on a file, fsTK module 210 inserts the one or more requested tools 212 as handlers for processing all requests for those files. The fsTK module 210 will then trap those particular system calls and handle the I/O. Other files are unaffected.

Figure 3:
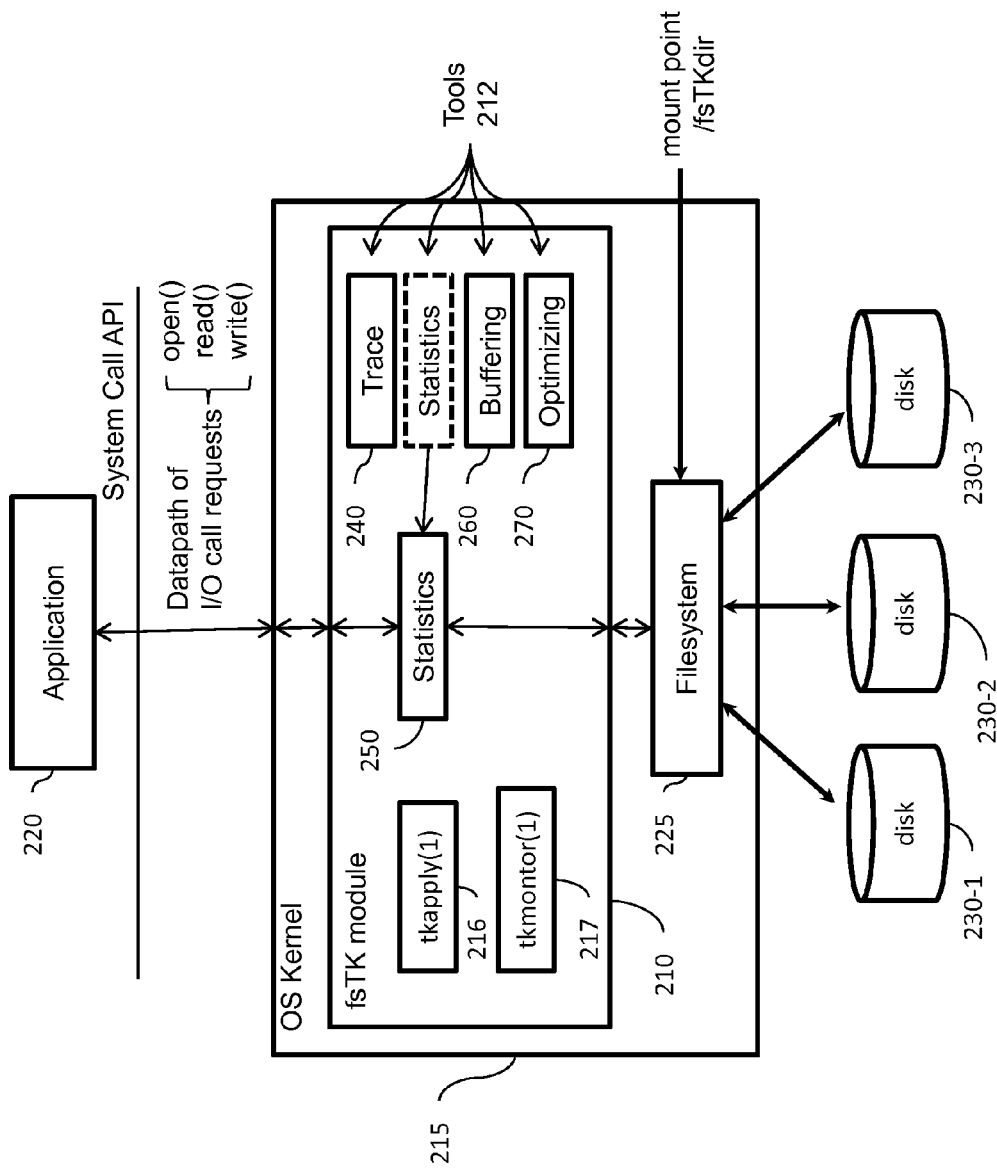

FIG. 3 provides an example of an embodiment where for one run of application 220, the user has requested fsTK module 210 to apply the statistics tool 250 to produce information about I/O to the specified files or directories. Such information can include, but is not limited to: how much data is the application moving; what files is the application using, and how much, and how often; what types of files are you accessing with this disk storage device, and is the access sequential or random. Trace tools 240 similarly monitors I/O access calls by simply keeping a log of each I/O call to the specified files and directories.

For example, if application 220 is NASTRAN, and user has directed NASTRAN to access all of its files via the mount point mounted via fsTK module 210, the statistics tools can be used to explore what NASTRAN is doing in terms of I/O. The trace and statistics tools 240, 250 will simply save the information they collect on a storage devices 230-1 to 230-3 without otherwise modifying I/O calls. A separate utility provides a way to display the information such as in a timeline, for example. For example, the statistical information may tell the user that application 220, for the first hour of execution was making large numbers of requests for a particular file, and for the second hour was using nine other files. It may further provide information such as showing that file "a.dat" was being accessed randomly, accessing file "b.dat" uses a lot of bandwidth and that when file "c.dat" is accessed, application 220 re-requests to read the same byte over and over again. In one embodiment, the statistical information is saved to a statistics file (which can be stored in a designated stats directory, for example). Once application 220 is finished running, the user can request the statistics file, which will document everything that the application 220 did to the specified files and/or directories. The user can specify how much detail is wanted such as, for example, how many files were opened, how much data was moved, and provide a time-stamped tracking of every I/O call made to the specified files and directories. In one embodiment, fsTK module 210 further comprises additional utilities (shown as tkmonitor(1) at 217) that are used to analyze and utilize the data produced by the fsTK statistics tool 250 and tracing tool 240.

The trace and statistics tools 240 and 250 thus provide advantages for users, administrators and application developers where fsTK module 210 is in use. Users and developers will have an easy way to monitor the I/O behavior of their applications. The statistics tools provide valuable "hints" as to how to further utilize fsTK tools 260, 270 to optimize performance. With the added visibility of I/O calls, and the debugging and experimentation options opened up by the statistics tools, the support value of fsTK module 210 is also compelling. Using the statistical information, the user can, for example, change application parameters and disable any unneeded operations that increase disk access time, and therefore total application execution time.

In addition to simply monitoring I/O using trace and statistics tools 240 and 250, the user can also use the tkapply(1) command to instruct fsTK module 210 to alter how access to specific files are handled.

Figure 4:
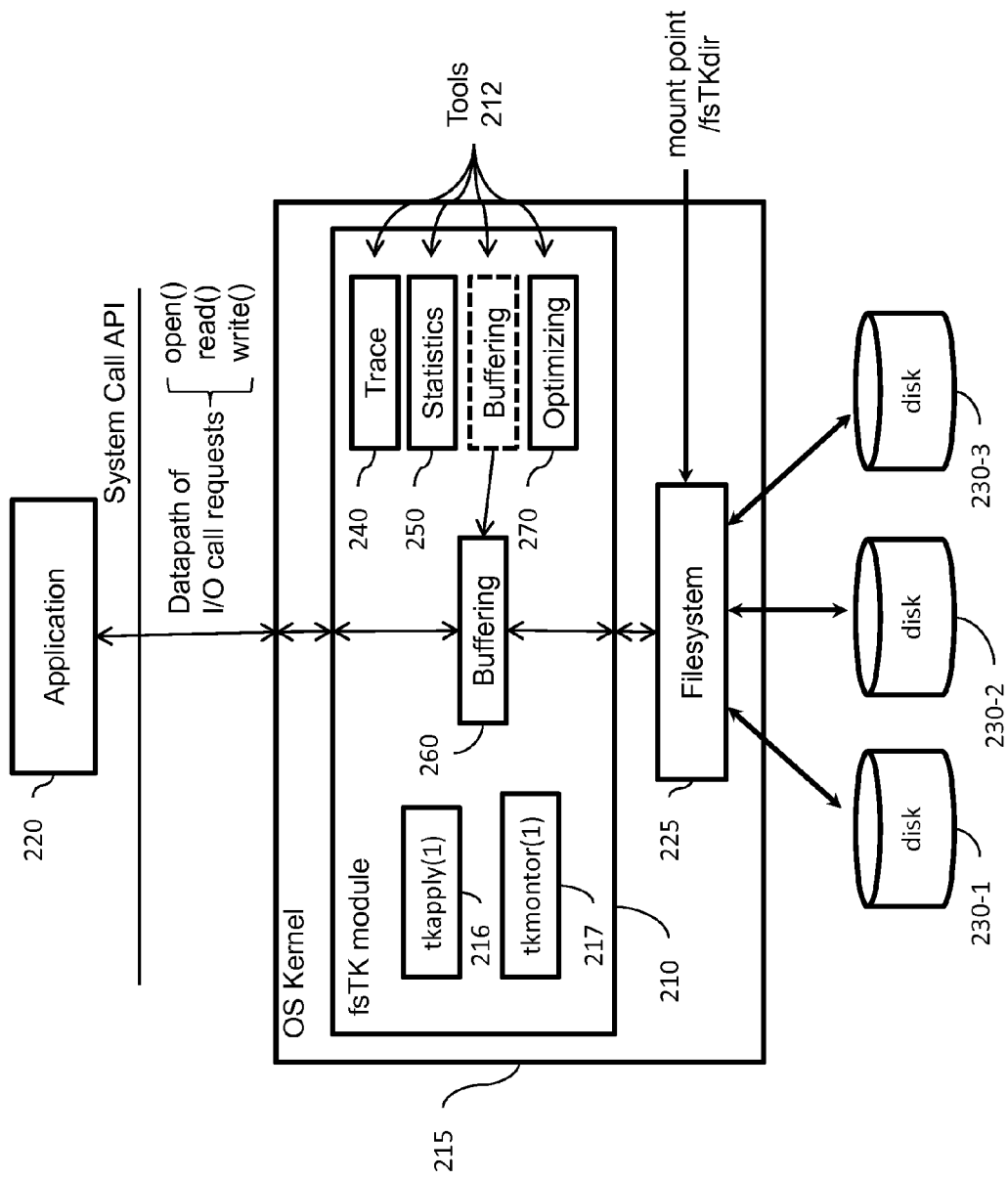

Illustrated in FIG. 4, buffering tool 260 provides one tool for directing how access to specific files are handled. In this case, fsTK module 210 inserts buffering tool 260 into the datapath of I/O call requests for files and/or directories specified via the tkapply(1) command. Utilization of buffering tool 260 improves I/O efficiency by aggregating many small requests to the filesystem 225 into fewer, larger requests. For example, where statistics information has shown that application 220 makes repeated multiple, but small, updates to file "a.dat", the user can specify usage of buffering tool 260 to file "a.dat". Instead of passing every I/O write request for file "a.dat" to filesystem 225, fsTK module 210 will buffer these requests based on some quality of service criteria, and then make a single I/O write request to file "a.dat". Buffering tool 260 may further maintain "a.dat" in memory 114 (or other available buffer device) to allow quick read/write access to the file, re-saving it to one of disk storage devices 230-1 to 230-3, either periodically or based on some other quality of service criteria. Such buffering improves the efficiency of the filesystem 225 and physical disk storage devices 230-1 to 230-3, without changing the application code.

Figure 5:
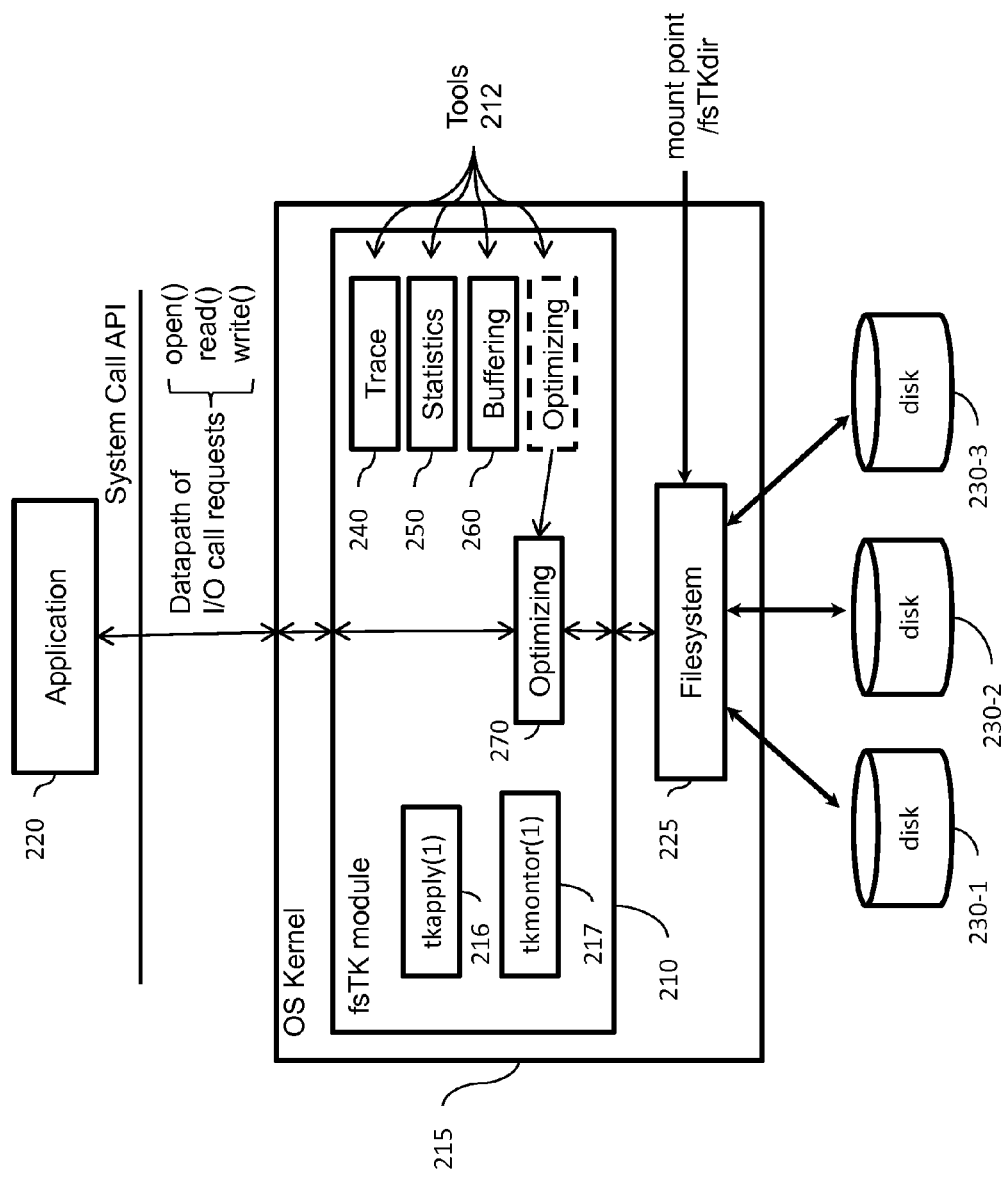

As illustrated in FIG. 5, another tool provided by fsTK module 210 is optimizing tool 270. Optimizing tool 270 is used to direct filesystem 225 to route I/O calls made to specified files and directories to a device specified by the optimizing tool. For example, using optimizing tool 270, a user that knows that a file ("big.dat", for example) is a large file, and requires large bandwidth for its I/O, can use the tkapply(1) command to direct "big.dat" onto a disk storage device that utilizes a 10-wide RAID stripe (storage device 230-1, for example). Similarly, a randomly accessed database file ("db-.dat", for example) may be directed to a disk storage device that utilizes a fast single drive (storage device 230-2, for example). Alternately, if the user knows that the application produces a scratch data set that is frequently accessed, the tkapply(1) command can direct fsTK module 210 to direct filesystem 225 to store that data set on a virtual drive (storage device 230-3 for example) to reduce latency. Thus the user can apply his or her knowledge about a file's characteristics and usage to designate what type of device should be used to store that file.

Figure 6:
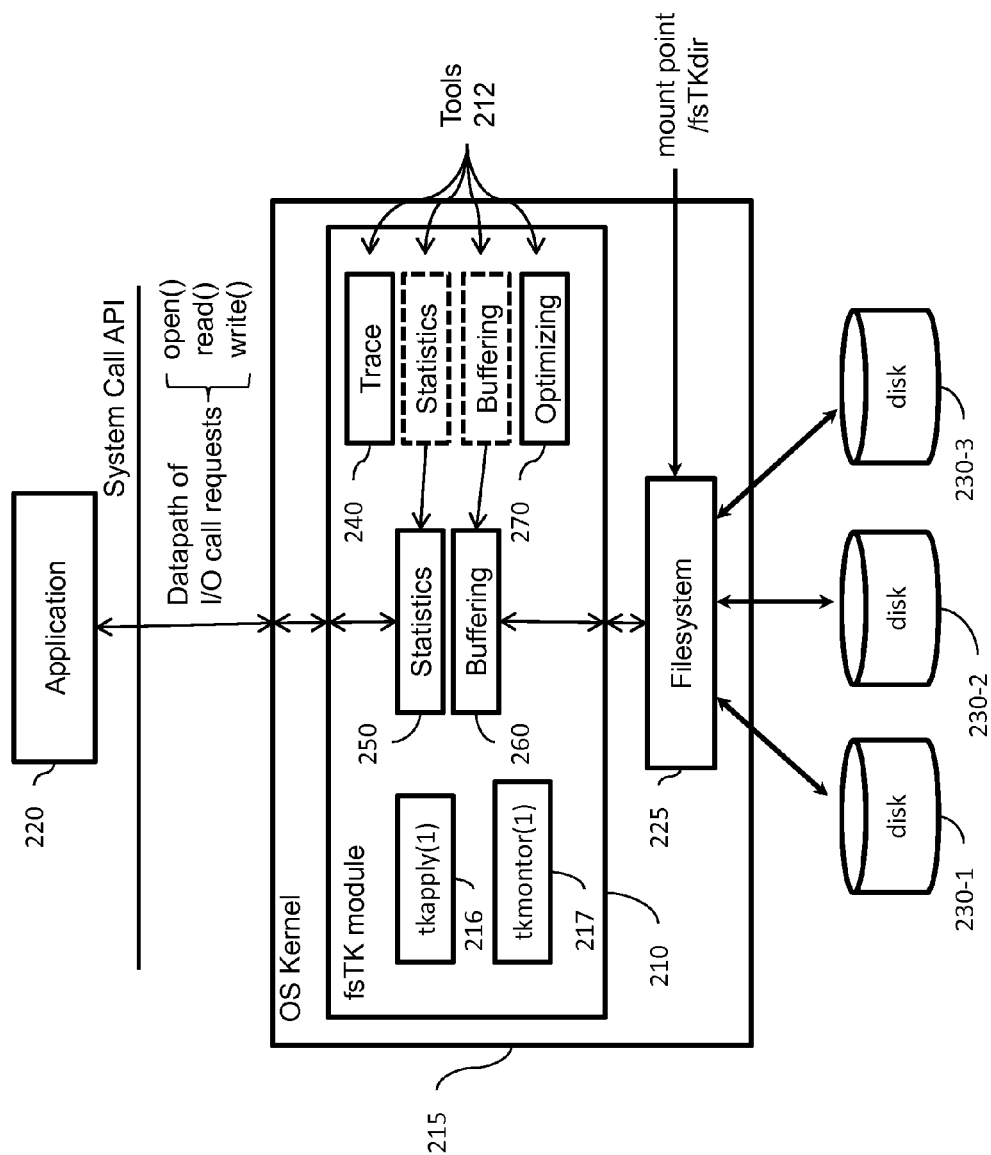

Tools 212 can be combined as shown in FIG. 6. In this case, the statistics tool 250 is combined with a buffering tool 260 to provide improved performance, and also information about the requests being made to the buffering tool 260. In other cases, combinations involving any combination of the tools are possible.

As mentioned above, fsTK module 210 re-presents to applications 220 the existing storage options available under filesystem 225. The fsTK module 210 mounts one or more of the backing storage devices 230-1 to 230-3 under the fsTK module 210. For example, in one embodiment fsTK module 210 is loaded into OS kernel 220 to act upon files accessed via a specified device mount point in the host 110's directory tree. For example, in one embodiment, the following usage of the UNIX "mount" command loads fsTK module 210:

mount -t fsTK --back ffs /dev/wd3f /scr

This command line specifies that the "fsTK" module mounts the storage options provided by physical data storage device "/dev/wd3f" at the mounting point "/root/scr" using the file system type "ffs." Physical device "/dev/wd3f" would refer to one of the data storage devices 230-1 to 230-3. After this command is entered, any I/O file access calls by application 220 to a file stored in "/root/scr" will be captured by fsTK module 210 and directed to physical device "/dev/wd3f". The fsTK module 210 is inserted into the data stream at "/root/scr", acting as a proxy for I/O operations on the underlying ffs file system. That is, the underlying ffs file system is mounted by the fsTK module 210 rather than directly by the administrator. Multiple physical devices may be made accessible to fsTK module 210 by entering multiple options on the mount command. For example, the option for using optimization tool 270 to direct I/O to either a RAID storage disk device at 230-1 or a single drive storage device at 230-2 can be provided by specifying the physical device associated with these storage disk devices via multiple options on the mount command line.

Although, the mount command inserts fsTK module 210 into the data stream, it is the tkapply(1) command, as previously described, that directs what, if any, actions are taken in the handling of specific files.

Figure 7:
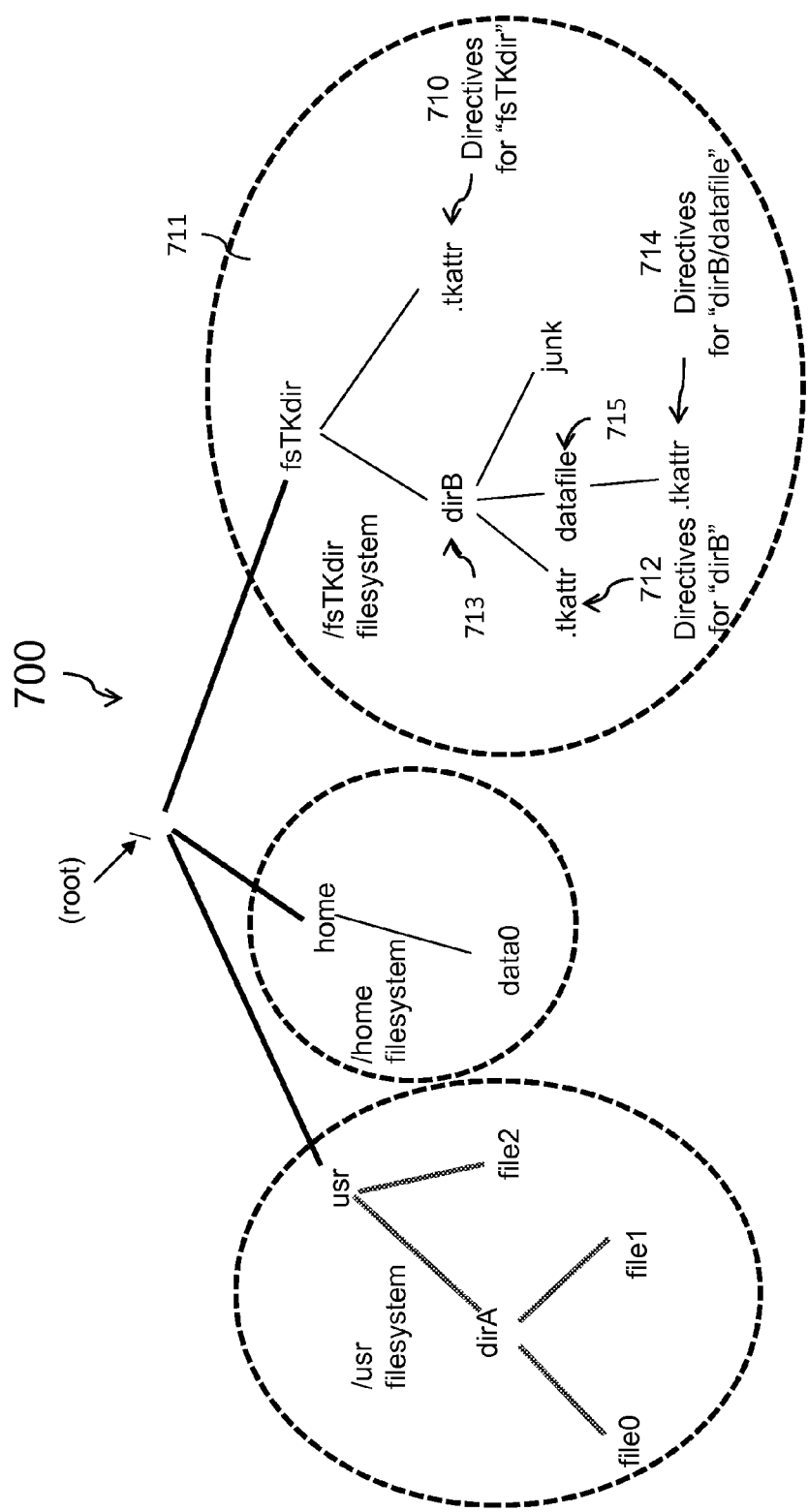
FIG. 7 is an illustration of a directory tree wherein a filesystem toolkit is installed.

FIG. 7 is an illustration of a directory tree 700 wherein an fsTK module is installed. A command such as:

mount -t fsTK --back ffs /dev/wd3f /fsTKdir would specify that data accessed via the /root/fsTKdir is stored on data storage device /dev/wd3f and that calls to /root/fsTKdir will be captured by the fsTK module. In this embodiment, directives requested by the user using the tkapply(1) command are stored in the fsTK filesystem, in directive files shown at (710, 712 and 714) as files with the name ".tkattr" in FIG. 7. As would be appreciated by one of ordinary skill in the art upon reading this specification, other file names besides ".tkattr" may be used for directive files in other embodiments, and in some embodiment, the name of the directive file is user selectable. If no specific directives are provided by a .tkattr file, then by default, access calls are just passed through to the filesystem.

In FIG. 7, there are three illustrations of how ".tkattr" files are used to direct the fsTK module to handle I/O for files. The first of three ".tkattr" files is located in /fsTKdir/.tkattr (shown at 710). The directives provided in that .tkattr file 710 apply to all files in the fsTKdir file system (shown generally at 711). The second of three ".tkattr" files is located in /fsTKdir/dirB/.tkattr (shown at 712), which applies to all files in /fsTKdir/dirB directory and any child directories of /fsTKdir/dirB (shown at 713). The third of three ".tkattr" files is located in /fsTKdir/dir/data/.tkattr (shown at 714). The directives in this third ".tkattr" applies only to the file "datafile" (shown at 715). Each of these ".tkattr" files 710, 712 and 714, referred to herein as "directive files", establishes fsTK module behaviors depending on where they are located in the filesystem. General directives can thus be overridden by more specific directives on files or directories in the areas of the file system already affected by the directive(s). For instance, /fsTKdir/.tkattr could direct that all files in /fsTKdir 711 be opened with the statistics tool 250, to collect statistics on I/O to all files. If no other directives are applied, all I/O with /fsTKdir 711 would be tracked and counted by the statistics tool 250. If in /fsTKdir/dirB/.tkattr 712, a directive were found to apply a performance tool (such as buffering tool 260 or optimization tool 270), and no stats, to all files ending with ".dat", then files in directory /fsTKdir/dirB 713 matching the criteria would handled as specified, regardless of the "defaults" set up by /fsTKdir/.tkattr 710. The most specific .tkattr file is one that is specific to a particular file. It is accessed by treating the file as a directory and referring to the .tkattr file. The directive file /fsTKdir/dir/data/.tkattr 714 is such a case. "datafile" 715 is a file, and has no child, but fsTK module 210 allows references to file /fsTKdir/dir/data/.tkattr 714 for this purpose. That is, the namespace usage for directive files is standard for directories, but fsTK module 210 treats files as directories for the purposes of referencing a directive file associated with specific files.

Figure 8:
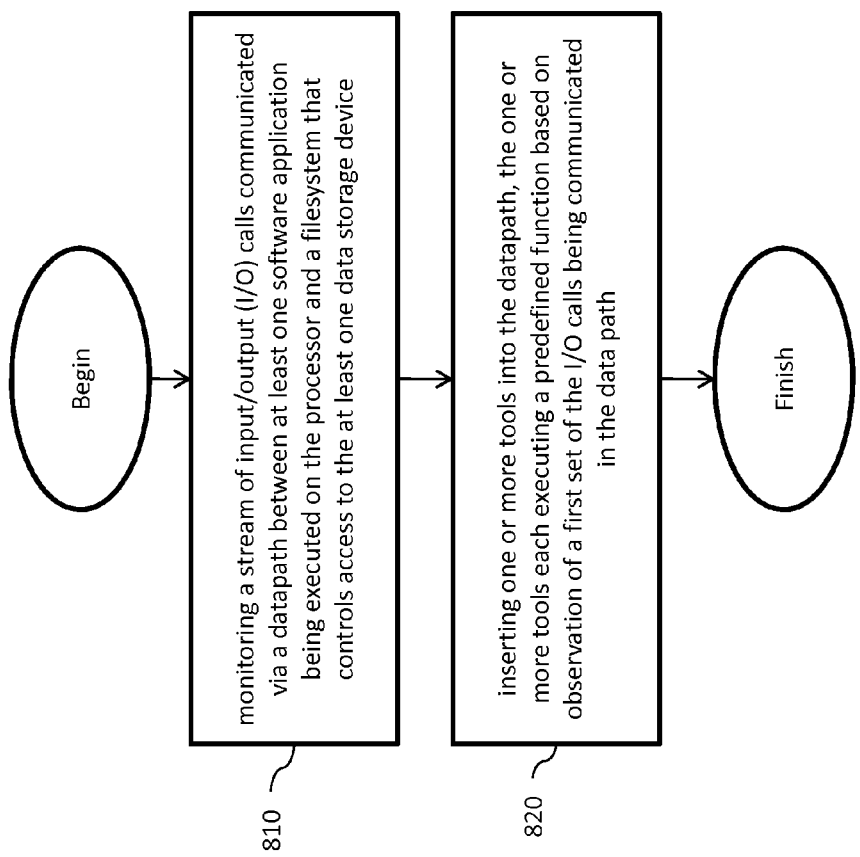
FIG. 8 is a flow chart illustrating a method of one embodiment of the present invention.

FIG. 8 is a flow chart illustrating a method of one embodiment of the present invention for managing I/O throughput. In one embodiment, the method is implemented as an algorithm using the systems described above with respect to FIGS. 1-7. As such, alternate embodiments of the method shown in FIG. 8 include those variations in embodiments described above. In one embodiment, the method of FIG. 8 is embodied on a computer-readable media for a computer system having a processor, a memory and at least one data storage device. The computer-readable media has stored there on a method for implementing a toolkit module within an operating system kernel.

The method begins at 810 with monitoring a stream of input/output (I/O) calls communicated via a datapath between at least one software application being executed on the processor and a filesystem that controls access to the at least one data storage device. The method then proceeds to 820 with inserting one or more tools into the datapath, the one or more tools each executing a predefined function based on observation of a first set of the I/O calls being communicated in the datapath. As described above, in one embodiment, determining which of the I/O calls belongs to the first set of the I/O calls is determined based on directives stored in a directive file. In one embodiment, those directives specify file and directories based on the filenames of the files being accessed. For those files not designated for special handling, their associated I/O calls are passed directly to the filesystem without modification. In one embodiment, the method further defines the datapath being monitored based on a specified device mount point in a directory tree for the at least one data storage device.

The inserted tools may include one or more of, but not limited to, a tracing tool, a statistical tool, a buffering tool and an optimizing tool. For example, in one embodiment, the tracing tool generates a log of each I/O call within the first set of the I/O calls that are made to specified files and directories. In one embodiment, the statistical tool generates information from each I/O call within the first set of the I/O calls made to specified files and directories. The statistical information may include statistics such as, but not limited to, how many I/O calls are made to the specified files and directories and a statistic measuring how much data is being transferred between at least one software application and the specified files and directories. In one embodiment, tracing and statistical information are saved to a file. In one embodiment, the buffering tool aggregates one or more I/O calls to specified files and directories into a single I/O call while the optimizing tool directs the filesystem to route I/O calls made to specified files and directories to a device specified by the optimizing tool.

Several means are available to implement the systems and methods discussed in this specification. These means include, but are not limited to, digital computer systems, embedded processors, microprocessors, general purpose computers, programmable controllers and field programmable gate arrays (FPGAs) or application-specific integrated circuits (ASICs). Therefore one or more embodiments of the present invention are algorithms and program instructions resident on computer readable media which when implemented by such means enable them to implement embodiments of the present invention. Computer readable media for the memory and storage devices describe above comprise any form of a physical computer memory storage device. Examples of such a physical computer memory device include, but are not limited to, punch cards, firmware, magnetic disks or tapes, optical data storage systems, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

We claim:

1. A computer system, the system comprising:
 a processor executing an operating system embodied in non-transitory computer-readable media;
 a memory; and
 at least one data storage device, the operating system comprising:
  an operating system kernel;
  at least one filesystem controlling access to the at least one data storage device; and
  a toolkit module installed within the operating system kernel;

wherein the toolkit module monitors input/output (I/O) calls communicated via a datapath between at least one software application being executed on the processor and the filesystem; and wherein the toolkit module inserts one or more tools into the datapath, the one or more tools each executing a predefined function based on observation of a first set of the I/O calls being communicated in the datapath;

wherein the one or more tools comprises a statistics tool, wherein the statistics tool generates statistical information from each I/O call within the first set of the I/O calls made to specified files and directories;

wherein the statistical information includes at least one of:
- a number of I/O calls made to the specified files and directories; and
- a statistic measuring how much data is being transferred between the at least one software application and the specified files and directories.

2. The operating system of claim 1, wherein which of the I/O calls belongs to the first set of the I/O calls is defined by directives stored in a directive file for specified files and directories.

3. The operating system of claim 2, the toolkit module further comprising:
a support application accessible via a user interface, wherein the support application instructs the toolkit module as to which of the one or more tools to apply to which I/O calls by modifying the directives stored in the directives file.

4. The operating system of claim 1, wherein which of the I/O calls belongs to the first set of the I/O call is determined based at least in part on a filename of a file being accessed by the first set of the I/O calls.

5. The operating system of claim 1, wherein the toolkit passes any I/O calls not belonging to the first set of I/O calls to the filesystem without modification.

6. The operating system of claim 1, wherein the one or more tools comprises a trace tool, wherein the trace tool generates a log of each I/O call within the first set of the I/O calls made to specified files and directories.

7. The operating system of claim 1, wherein the one or more tools comprises a buffering tool, wherein the buffering tool aggregates one or more I/O calls to specified files and directories into a single I/O call.

8. The operating system of claim 1, wherein the one or more tools comprises an optimizing tool, wherein the optimizing tool directs the filesystem to route I/O calls made to specified files and directories to a device specified by the optimizing tool.

9. The operating system of claim 1, the toolkit module further comprising:
a support application accessible via a user interface, wherein the support application displays information collected by the one or more tools.

10. The operating system of claim 1, wherein the toolkit module defines the datapath based on a specified device mount point in a directory tree for the at least one data storage device.

11. A non-transitory computer-readable media for a computer system having a processor, a memory and at least one data storage device, the computer-readable media having stored there on a method for implementing a toolkit module within an operating system kernel, the method comprising:
monitoring a stream of input/output (I/O) calls communicated via a datapath between at least one software application being executed on the processor and a filesystem that controls access to the at least one data storage device; and inserting one or more tools into the datapath, the one or more tools each executing a predefined function based on observation of a first set of the I/O calls being communicated in the datapath;

wherein inserting one or more tools into the datapath further comprises:
inserting a statistics tool that generates statistical information from each I/O call within the first set of the I/O calls made to specified files and directories;

wherein the statistical information includes at least one of:
- a number of I/O calls made to the specified files and directories; and
- a statistic measuring how much data is being transferred between the at least one software application and the specified files and directories.

12. The computer-readable media of claim 11, the method further comprising:
determining which of the I/O calls belongs to the first set of the I/O calls based on directives stored in a directive file.

13. The computer-readable media of claim 11, the method further comprising:
determining which of the I/O calls belongs to the first set of the I/O calls based at least in part on a filename of a file being accessed by the first set of the I/O calls.

14. The computer-readable media of claim 11, the method further comprising:
passing any I/O calls not belonging to the first set of I/O calls to the filesystem without modification.

15. The computer-readable media of claim 11, the method further comprising:
inserting a tracing tool that generates a log of each I/O call within the first set of the I/O calls made to specified files and directories.

16. The computer-readable media of claim 11, the method further comprising:
inserting a buffering tool that aggregates one or more I/O calls to specified files and directories into a single I/O call.

17. The computer-readable media of claim 11, the method further comprising:
inserting an optimizing tool that directs the filesystem to route I/O calls made to specified files and directories to a device specified by the optimizing tool.

18. The computer-readable media of claim 11, the method further comprising:
defining the datapath based on a specified device mount point in a directory tree for the at least one data storage device.

* * * * *